(12) United States Patent
Ishii et al.

(10) Patent No.: US 7,998,428 B2
(45) Date of Patent: Aug. 16, 2011

(54) APPARATUS FOR PRODUCING TRICHLOROSILANE

(75) Inventors: Toshiyuki Ishii, Yokkaichi (JP); Hideo Ito, Kuwana (JP); Yuji Shimizu, Naka-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 277 days.

(21) Appl. No.: 12/226,201

(22) PCT Filed: Oct. 25, 2007

(86) PCT No.: PCT/JP2007/070843
§ 371 (c)(1),
(2), (4) Date: Oct. 10, 2008

(87) PCT Pub. No.: WO2008/053786
PCT Pub. Date: May 8, 2008

(65) Prior Publication Data
US 2009/0155138 A1 Jun. 18, 2009

(30) Foreign Application Priority Data

Oct. 31, 2006 (JP) ................................. 2006-297033
Oct. 16, 2007 (JP) ................................. 2007-268618

(51) Int. Cl.
*B01J 19/00* (2006.01)
*B01J 3/00* (2006.01)
(52) U.S. Cl. ........ 422/198; 422/199; 422/202; 422/240; 422/241; 422/242
(58) Field of Classification Search .................. 422/198, 422/199, 202, 240, 241, 242
See application file for complete search history.

(56) References Cited

U.S. PATENT DOCUMENTS

| 2,145,084 A | 1/1939 | Hersey |
| 2,683,688 A | 7/1954 | Tramm et al. |
| 4,023,520 A | 5/1977 | Reuschel |
| 4,343,772 A | 8/1982 | Frosch et al. |

(Continued)

FOREIGN PATENT DOCUMENTS

DE 3245636 A1 6/1984

(Continued)

OTHER PUBLICATIONS

International Search Report mailed Jan. 29, 2008, issued on PCT/JP2007/070843.

(Continued)

*Primary Examiner* — Walter D Griffin
*Assistant Examiner* — Lessanework Seifu
(74) *Attorney, Agent, or Firm* — Edwards Angell Palmer & Dodge LLP

(57) ABSTRACT

An apparatus for producing trichlorosilane, including: a reaction vessel in which a supply gas containing silicon tetrachloride and hydrogen is supplied to produce a reaction product gas containing trichlorosilane and hydrogen chloride; a heating mechanism that heats the interior of the reaction vessel; a storage container that stores the reaction vessel and the heating mechanism; a gas supply internal cylinder that supplies the supply gas in the reaction vessel; a gas discharge external cylinder that is substantially concentrically disposed outside the gas supply internal cylinder, forming a discharge passageway of the reaction product gas between an outer circumferential surface of the gas supply internal cylinder and an inner circumferential surface of the gas discharge external cylinder; and a cooling cylinder that supports the gas discharge external cylinder disposed inside thereof and includes a refrigerant passageway formed therein for circulating a refrigerant.

20 Claims, 1 Drawing Sheet

U.S. PATENT DOCUMENTS

| | | | |
|---|---|---|---|
| 4,351,805 A * | 9/1982 | Reisman et al. | 422/202 |
| 4,536,642 A | 8/1985 | Hamster et al. | |
| 4,668,493 A | 5/1987 | Levin | |
| 5,118,486 A | 6/1992 | Burgie et al. | |
| 5,382,412 A * | 1/1995 | Kim et al. | 422/142 |
| 5,906,799 A | 5/1999 | Burgie et al. | |
| 2002/0104474 A1 | 8/2002 | Wakamatsu et al. | |
| 2003/0089279 A1 | 5/2003 | Meyer et al. | |
| 2004/0107883 A1 | 6/2004 | Cabrera-Llanos et al. | |

FOREIGN PATENT DOCUMENTS

| | | |
|---|---|---|
| EP | 0875281 A1 | 11/1998 |
| EP | 1454670 A1 | 9/2004 |
| FR | 656 254 A | 5/1929 |
| JP | 57-012826 | 1/1982 |
| JP | 57-156318 | 9/1982 |
| JP | 60-122714 | 7/1985 |
| JP | 62-021706 | 1/1987 |
| JP | 62-123011 | 6/1987 |
| JP | 3781439 | 10/1994 |
| JP | 09-157073 | 6/1997 |

OTHER PUBLICATIONS

Supplementary European Search Report dated Jan. 14, 2011, issued for the corresponding European Patent Application No. 07830577.8.

* cited by examiner

APPARATUS FOR PRODUCING TRICHLOROSILANE

CROSS REFERENCE TO RELATED APPLICATIONS

This application is related to three co-pending applications: "APPARATUS FOR PRODUCING TRICHLOROSILANE" filed even date herewith in the names of Toshiyuki ISHI, Hideo ITO, Yuji SHIMIZU as a national phase entry of PCT/JP2007/070715 filed Oct. 24, 2007; "APPARATUS FOR PRODUCING TRICHLOROSILANE" filed even date herewith in the name of Toshiyuki ISHI, Hideo ITO, Yuji SHIMIZU as a national phase entry of PCT/JP2007/070725 filed Oct. 24, 2007; and "APPARATUS FOR PRODUCING TRICHLOROSILANE" filed even date herewith in the name of Toshiyuki ISHI, Hideo ITO, Yuji SHIMIZU as a national phase entry of PCT/JP2007/070644 filed Oct. 23, 2007; which applications are assigned to the assignee of the present application and all three incorporated by reference herein.

TECHNICAL FIELD

The present invention relates to an apparatus for producing trichlorosilane, which converts silicon tetrachloride into trichlorosilane.

This application claims priority on Japanese Patent Application No. 2006-297033, filed Oct. 31, 2006, and on Japanese Patent Application No. 2007-268618, filed Oct. 16, 2007, the disclosure of which is incorporated by reference herein.

BACKGROUND ART

Trichlorosilane ($SiHCl_3$), which is used as a raw material for the production of highly pure silicon (Si), can be produced by conversion through a reaction of silicon tetrachloride ($SiCl_4$: tetrachlorosilane) with hydrogen.

In other words, silicon is produced by the reductive reaction and the thermolysis reaction of trichlorosilane represented by reaction schemes (1) and (2) shown below, and trichlorosilane is produced by the conversion reaction represented by reaction scheme (3) shown below.

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

As an apparatus for producing trichlorosilane, for example, Patent Document 1 (Japanese Patent No. 3,781,439) proposes a reactor in which a reaction chamber surrounded by a heating element is of a dual chamber design having an outer chamber and an inner chamber formed by two concentrically positioned pipes, a supply gas of hydrogen and silicon tetrachloride is supplied to the reaction chamber from below via a heat exchanger disposed in the bottom of this reaction chamber, and a reaction product gas is discharged from the reaction chamber in a downward direction. In the heat exchanger of this reactor, the supply gas supplied to the reaction chamber is preheated by heat transferred from the reaction product gas discharged from the reaction chamber, and also the reaction product gas to be discharged is cooled.

DISCLOSURE OF THE INVENTION

The following problems remain in the prior art described above.

In the above conventional apparatus for producing trichlorosilane, the reaction product gas is cooled by making heat exchange with the supply gas supplied by the heat exchanger disposed in the bottom of the reaction chamber. However, if the reaction product gas to be discharged is not rapidly cooled, in the conversion reaction of silicon tetrachloride into trichlorosilane in accordance with the reaction scheme shown above (3), reverse reaction from trichlorosilane also occurs. Therefore, there was a problem that conventional cooling due to heat exchange between gases exerted insufficient rapid cooling effect and the ratio of conversion into trichlorosilane was low.

In light of these problems, the present invention has been made and an object thereof is to provide an apparatus for producing trichlorosilane, which can improve a conversion ratio by rapidly cooling a reaction product gas, efficiently.

The present invention employed the following constitution so as to solve the above problems. The apparatus for producing trichlorosilane of the present invention is an apparatus for producing trichlorosilane, including: a reaction vessel in which a supply gas containing silicon tetrachloride and hydrogen is supplied to produce a reaction product gas containing trichlorosilane and hydrogen chloride; a heating mechanism that heats the interior of the reaction vessel; a storage container that stores the reaction vessel and the heating mechanism; a gas supply internal cylinder that supplies the supply gas into the reaction vessel; a gas discharge external cylinder that is substantially concentrically disposed outside the gas supply internal cylinder, forming a discharge passageway of the reaction product gas between an outer circumferential surface of the gas supply internal cylinder and an inner circumferential surface of the gas discharge external cylinder; and a cooling cylinder that supports the gas discharge external cylinder disposed inside thereof and includes a refrigerant passageway formed therein (in the cooling cylinder) for circulating a refrigerant.

In this apparatus for producing trichlorosilane, since the gas discharge external cylinder disposed outside the gas supply internal cylinder is supported inside the cooling cylinder including the refrigerant passageway formed therein, when the reaction product gas in a high-temperature state discharged from the reaction vessel flows in the discharge passageway inside the gas discharge external cylinder and is discharged, it is rapidly cooled by the exterior cooling cylinder and is further cooled by heat exchange with the supply gas flowing in the interior gas supply internal cylinder via a wide cylinder surface of the gas supply internal cylinder. Namely, by both effects of cooling through the cooling cylinder and heat exchange with the supply gas, the reaction product gas is rapidly cooled and discharged. Therefore, the reverse reaction of conversion is suppressed and a stable conversion reaction is maintained, and thus a conversion ratio can be improved.

The apparatus for producing trichlorosilane may be provided with an argon supply mechanism that supplies argon in the storage container. Since argon is supplied in the storage container by the argon supplying mechanism in this apparatus for producing trichlorosilane, leakage of the supply gas and the reaction product gas from the reaction vessel can be prevented by the periphery of the reaction vessel being in a pressurized state by argon. Thus, it is possible to prevent reaction of the supply gas and the reaction product gas which have leaked from the reaction vessel with carbon used in the reaction mechanism and the like outside the reaction vessel. Also, by supplying argon to the periphery of the gas discharge external cylinder by the argon supplying mechanism, the gas discharge external cylinder can be further cooled and also rapid cooling of the reaction product gas circulating inside can be promoted.

In the apparatus for producing trichlorosilane, a reaction passageway may be formed in the interior of the reaction vessel, in which a plurality of small spaces partitioned by a plurality of reaction tubular walls that have different inner diameters and are substantially concentrically disposed communicate by flow penetration sections formed alternately in lower portions and upper portions of the reaction tubular walls in order from the inside, and the gas supply internal cylinder and the gas discharge external cylinder may be connected to the reaction passageway. In this apparatus for producing trichlorosilane, the supply gas supplied to the reaction passageway in the reaction tubular walls sequentially flows into an outer or inner space partitioned by the reaction tubular walls via a flow penetration section while being heated, and is converted into a reaction product gas through the reaction. In this case, since the flow penetration sections are alternately formed in lower portions and upper portions of the reaction tubular walls in order from the inside, the flow direction of the gas repetitively changes between upward direction and downward direction, alternately, every time the gas moves to the outer or inner small space. Therefore, the long reaction passageway is ensured in the reaction vessel and the heat conducting area increases on a plurality of reaction tubular walls, and thus sufficient retention time and heating required to react the supply gas can be ensured and a conversion ratio can be more improved. By continuously forming the reaction passageway so as to meander up and down, the size of the entire reaction vessel can be reduced and also heat dissipation of the entire reaction vessel can be reduced.

In this case, each of the flow penetration sections may be a through-hole formed on the reaction tubular wall in aftermentioned embodiments or a notch formed at the upper end portion or the lower end portion of the reaction tubular wall, and the like.

In the apparatus for producing trichlorosilane, the gas supply internal cylinder may be in communication with the innermost small space of the plurality of small spaces and the discharge passageway may be connected to the outermost small space. In this apparatus for producing trichlorosilane, since the gas supply internal cylinder is in communication with the innermost small space of the reaction passageway and the discharge passageway is connected to the outermost small space, the reaction product gas in a highest-temperature state obtained by the heating mechanism is transferred from the outermost small space to the discharge passageway in the gas discharge external cylinder. Therefore, by rapidly cooling the reaction product gas in a highest-temperature state in the gas discharge external cylinder, more rapid cooling operation can be obtained and stable conversion reaction can be obtained.

In the apparatus for producing trichlorosilane, the gas supply internal cylinder and the gas discharge external cylinder may be disposed above the reaction vessel, and the central portion of a bottom plate of the reaction vessel may be supported by a support column member, which protrudes upward in the storage container from below.

With such constitution, since the bottom plate of the reaction vessel is maintained in a state of floating from the inner bottom surface of the storage container by the support column member, interstitial heat-insulation space is formed and also thermal expansion of the wall of the reaction vessel can be absorbed by deflection of the bottom plate. The bottom plate of the reaction vessel may be a lower supporting circular plate described in after-mentioned embodiments.

The members that form the reaction vessel of the apparatus for producing trichlorosilane may be formed of carbon.

The surface of the carbon of the apparatus for producing trichlorosilane may be coated with silicon carbide. Since the reaction vessel is formed of carbon coated with silicon carbide (SiC) in this apparatus for producing trichlorosilane, the production of impurities such as methane, methylchlorosilane, silicon carbide, and the like by the reaction of carbon with hydrogen, chlorosilane and hydrogen chloride (HCl) in the supply gas and the reaction product gas can be prevented and thus a highly pure trichlorosilane can be obtained.

According to the present invention, the following effects are exerted.

According to the apparatus for producing trichlorosilane, since the gas discharge external cylinder disposed outside the gas supply internal cylinder is supported inside the cooling cylinder including the refrigerant passageway formed therein, the reaction product gas is rapidly cooled by both effects of cooling through the cooling cylinder and heat exchange with the supply gas. The reverse reaction of conversion is suppressed, and thus trichlosilane can be obtained at a high conversion ratio.

BEST MODE FOR CARRYING OUT THE INVENTION

Figure 1:
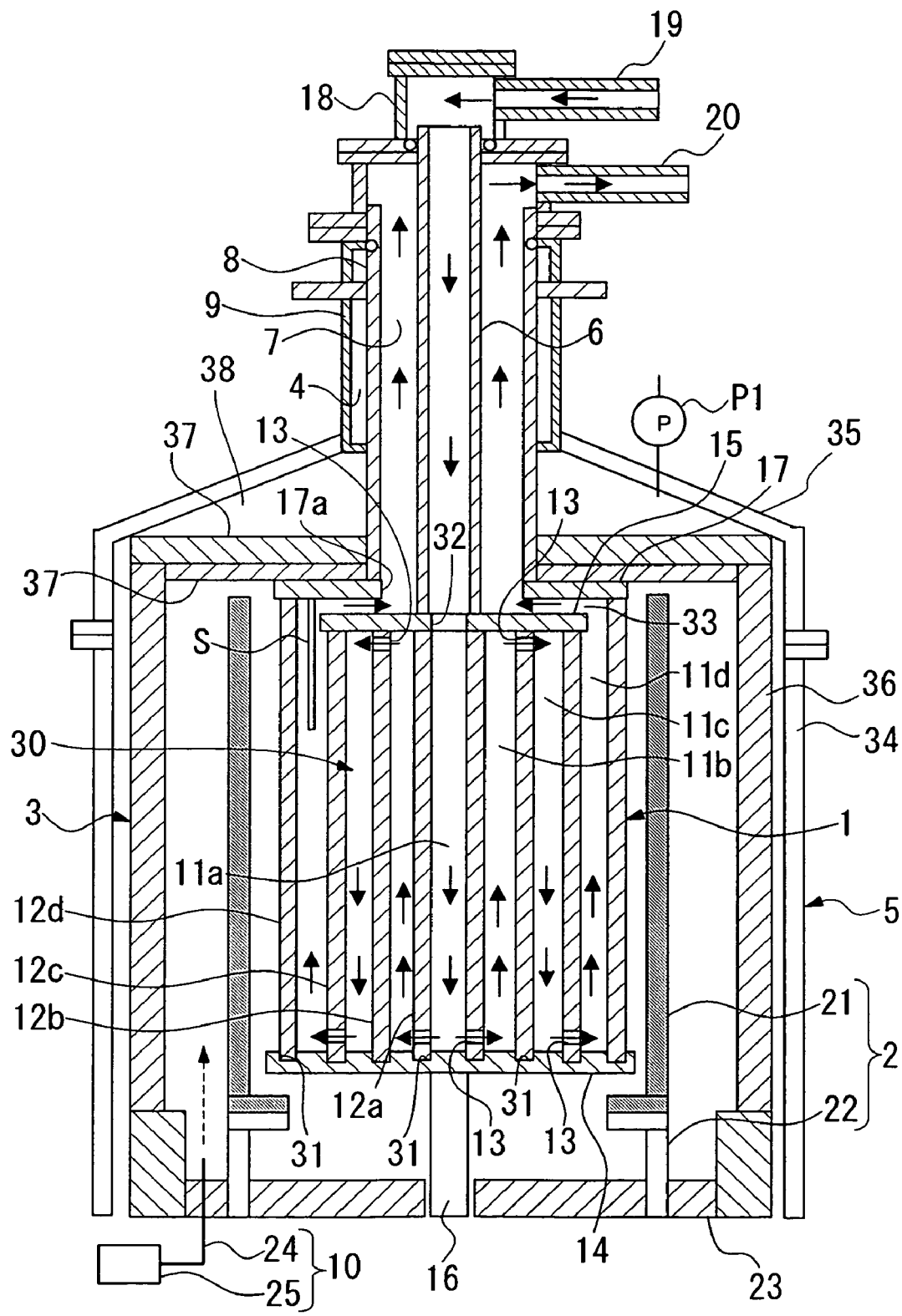
FIG. 1 is a schematic sectional view showing an embodiment of an apparatus for producing trichlorosilane of the present invention.

An embodiment of the apparatus for producing trichlorosilane of the present invention will be described below with reference to FIG. 1.

As shown in FIG. 1, the apparatus for producing trichlorosilane of the present embodiment includes a reaction vessel 1 in which a supply gas containing silicon tetrachloride and hydrogen is supplied to produce a reaction product gas containing trichlorosilane and hydrogen chloride by conversion reaction; a heating mechanism 2 disposed in the periphery of the reaction vessel 1 for heating the reaction vessel 1; a heat insulating material 3 disposed so as to cover the periphery of the reaction vessel 1 and the heating mechanism 2; a storage container 5 for storing the reaction vessel 1, the heating mechanism 2 and the heat insulating material 3; a gas supply internal cylinder 6 disposed on the reaction vessel 1 for supplying the supply gas into the reaction vessel 1 from the upper portion; a gas discharge external cylinder 8 that is concentrically disposed outside the gas supply internal cylinder 6, forming a discharge passageway 7 of the reaction product gas discharged from the reaction vessel 1 between an outer circumferential surface of the gas supply internal cylinder 6 and an inner circumferential surface of the gas discharge external cylinder; a cooling cylinder 9 which supports the gas discharge external cylinder 8 disposed inside thereof and includes a refrigerant passageway 4 formed therein for circulating water (refrigerant); and an argon supplying mechanism 10 for supplying argon (Ar) in the storage container 5.

In order to partition the inner space into a plurality of small spaces 11a to 11d, the reaction vessel 1 is provided with cylindrical first to fourth reaction tubular walls 12a to 12d which have different inner diameter. In other words, the space (space which is inside the outermost fourth reaction tubular wall 12d) in the reaction vessel 1 is partitioned into one columnar small space 11a in the center and three tubular small spaces 11b to 11d outside the center by three first to third reaction inner walls 12a to 12c. Also, the gas supply internal cylinder 6 is in communication with the upper portion of the columnar small space 11a as the inner space of the innermost first reaction tubular wall 12a, and the discharge passageway 7 is connected to the outermost small space 11d.

Flow through-holes 13 are alternately formed in lower portions and upper portions of these first to third reaction tubular walls 12a to 12c in order from the inside. In other words, a plurality of through-holes 13 are formed in a lower portion of the first reaction tubular wall 12a in a circumferential direction, while a plurality of flow through-holes 13 are formed in an upper portion of the second reaction tubular wall 12b in a circumferential direction. Also, a plurality of flow through-holes 13 are formed in a lower portion of the third reaction tubular wall 12c in a circumferential direction. Thus, a reaction passageway 30 in which small spaces 11a to 11d are in a communication state in order from the inside is formed by these flow through-holes 13.

Therefore, it is set so that the supply gas supplied to the small space 11a inside the first reaction tubular wall 12a, while being heated, becomes a reaction product gas by reaction while sequentially flowing to the outer small spaces 11b to 11d via a plurality of flow through-holes 13. Also, by the gas flowing between the flow through-holes 13 disposed alternatively up and down of the reaction tubular wall 12a to 12c from the inside, it is set so that the flow direction of the gas repetitively changes to the up direction and the down direction. In the drawing, the flow direction of the gas is indicated by arrows.

The lower portions of the first to third reaction tubular walls 12a to 12c are supported by fitting in ring-shaped grooves 31 of a lower supporting circular plate 14 and the upper portions are fixed by an upper supporting circular plate 15. The lower end of a gas supply internal cylinder 6 is fixed to the top portion of the upper supporting circular plate 15. Also, the upper supporting circular plate 15 is formed with a central hole 32 and the small space 11a on the inside of the first reaction tubular wall 12a is in communication with a gas supply internal cylinder 6 via the central hole 32. The center of the lower supporting circular plate 14 is supported by a support column member 16. This support column member 16 protrudes upward from the center of a bottom supporting member 23 which forms a bottom plate of the storage container 5. The central portion of the lower supporting circular plate 14 is supported by the upper end of the support column member 16. Thus, the lower supporting circular plate 14 is in a state of floating from the bottom supporting member 23.

The fourth reaction tubular wall 12d is set to be slightly higher compared to the first to third reaction tubular walls 12a to 12c, and the lower portion is supported by fitting in the ring-shaped groove 31 of the lower supporting circular plate 14 and the upper portion is fixed to an upper annular plate 17 having annular shape. The upper annular plate 17 is disposed upward at a predetermined interval from the upper supporting circular plate 15 and a flat communicating passageway 33 is horizontally formed between the upper annular plate 17 and the upper supporting circular plate 15. Furthermore, the lower end of a gas discharge external cylinder 8 is fixed on the upper annular plate 17. An inner diameter of a lower opening of the gas discharge external cylinder 8 is set to the same inner diameter of a central opening 17a of the upper annular plate 17, and the opening is set to agree with each other. Therefore, the communicating passageway 33 between the upper supporting circular plate 15 and the upper annular plate 17 is connected to a discharge passageway 7 via the central opening 17a of the upper annular plate 17.

The upper end portion of the gas supply internal cylinder 6 is opened in a supply gas introducing section 18 disposed at the upper portion of the cooling cylinder 9. A supply gas introducing pipe 19 is connected in the supply gas introducing section 18, and thus the supply gas from a supply source (not shown) of the supply gas is supplied in the gas supply internal cylinder 6 through the supply gas introducing pipe 19 via the supply gas introducing section 18.

The upper end opening of the gas discharge external cylinder 8 is disposed at a predetermined interval from the upper end portion of the cooling cylinder. A gas discharge pipe 20 is connected to the upper portion of the gas discharge external cylinder 8. Thus the reaction product gas from the upper opening of the gas discharge external cylinder 8 is discharged to the outside from the gas discharge pipe 20 via the upper portion surrounded by the cooling cylinder 9.

With respect to each of the members forming the reaction vessel 1, in this embodiment, the first to fourth reaction tubular walls 12a to 12d, the lower supporting circular plate 14, the upper supporting circular plate 15, the upper annular plate 17, the gas supply internal cylinder 6 and the gas discharge external cylinder 8 are formed of carbon and the surface of the carbon is coated with silicon carbide.

The storage container 5 is provided with a tubular wall 34 disposed outside the heat insulating material 3 in a radial direction and a taper section 35 disposed integrally on the upper end of the tubular wall 34 to cover the reaction vessel 1 together with the interior heat insulating material 3, while the cooling cylinder 9 is integrally disposed on the upper end of the taper section 35. The storage container 5 and the cooling cylinder 9 are made of stainless steel.

The heating mechanism 2 is provided with a heater 21, which is a heating element, in the periphery of the reaction vessel 1 so as to enclose the reaction vessel 1 and with an electrode 22, which is connected to the bottom of the heater 21 and is for flowing an electric current to the heater 21. This electrode 22 is connected to a power supply (not shown). The heater 21 is formed of carbon. Also, the heating mechanism 2 carries out heating control so that the temperature inside the reaction vessel 1 becomes a temperature in the range from 800 to 1,400° C. If the temperature inside the reaction vessel 1 is set to 1,200° C. or higher, the conversion ratio is improved. Also, disilanes may be introduced to recover silanes.

The heat insulating material 3 is formed of, for example, carbon, and is provided with a tubular wall 36 disposed inside the tubular wall 34 of the storage container 5, and ceiling plate section 37 which block the space between the upper end of the tubular wall 36 and the gas discharge external cylinder 8. The lower portion of the heat insulating material 3 is supported by the circular bottom supporting member 23. This bottom supporting member 23 forms the bottom portion of the space surrounded by the heat insulating material 3, and also serves as the bottom portion of the storage container 5. In this case, the tubular wall 36 of the heat insulating material 3 is disposed so as to be pasted inside the tubular wall 34 of the storage container 5, leaving a slight space with the tubular wall. The ceiling plate section 37 of the heat insulating material 3 forms a conical ring-shaped space 38 between the taper section 35 of the storage container 5 and the gas discharge external cylinder 8. This heat insulating material 3 does not have a severe airtight structure to the space surrounded by the heat insulating material 3.

A temperature sensor S which protrudes into the outermost small space 11d in the reaction passageways 30 is fixed to the lower surface of the upper supporting annular plate 17. The temperature is controlled by the heating mechanism 2 while the temperature is measured by this temperature sensor S.

The argon supply mechanism 10 is provided with an argon supply pipe 24, the tip end thereof protruding into the storage container 5 (interior of the space surrounded by the heat insulating material 3 in the example shown in FIG. 1) by penetrating the bottom supporting member 23, and with an argon supply source 25 which is connected to the argon supply pipe 24. This argon supply mechanism 10 carries out argon supply control so that interior of the storage container becomes a predetermined pressurized state. Argon supplied in the storage container is also supplied to the lower periphery (the conical ring-shaped space 38) of the gas discharge external cylinder 8 protruding from the upper portion to the interior of the storage container 5. A container pump P1 for carrying out replacement of the inside atmosphere or argon exhaustion is connected to the top of the storage container 5.

In this embodiment, since the gas discharge external cylinder 8 disposed outside the gas supply internal cylinder 6 on the reaction vessel 1 is supported inside the cooling cylinder 9 for water cooling, when the reaction product gas in a high-temperature state discharged from the reaction vessel 1 flows in the discharge passageway 7 inside the gas discharge external cylinder 8 and then discharged, the reaction product gas is rapidly cooled by the exterior cooling cylinder 9 and is further cooled by heat exchange with the supply gas flowing in the interior gas supply internal cylinder 6 via a wide cylinder surface of the gas supply internal cylinder 6.

Namely, by both effects of cooling by the cooling cylinder 9 and heat exchange with the supply gas, the reaction product gas is rapidly cooled and discharged. Therefore, the reverse reaction of conversion is suppressed and a stable conversion reaction is maintained, and thus a conversion ratio can be improved. In the apparatus for producing trichlorosilane of the present embodiment, a mechanism for heat exchange between gasses is integrally disposed on the upper portion of the reaction vessel 1 and thus the size of entire apparatus can be reduced.

Also, since argon is supplied to the storage container 5 by the argon supplying mechanism 10, leakage of the supply gas and the reaction product gas from the reaction vessel 1 can be prevented by the periphery of the reaction vessel being in a pressurized state by argon. Thus, it is possible to prevent reaction of the supply gas and the reaction product gas which have leaked from the reaction vessel 1 with carbon used in the heating mechanism 2 and the like outside the reaction vessel 1. Also, by supplying argon to the periphery of the gas discharge external cylinder 8 by the argon supplying mechanism 10, the gas discharge external cylinder 8 can be further cooled and also rapid cooling of the reaction product gas circulating inside can be promoted.

When argon is supplied as a purge gas, since argon is supplied from the bottom of the storage container 5 by the argon supply mechanism 10, natural convection occurs in an upward direction by heating by the heater 21. Also, by suction from a container pump P1 connected to the top of the storage container 5, a high purge effect can be obtained by the purge gas flowing out smoothly from the bottom to the top.

Since flow through-holes 13 are alternately formed in lower portions and upper portions of the first to third reaction tubular walls 12a to 12c in order from the inside, the flow direction of the gas repetitively changes between upward direction and downward direction, alternately, every time the gas moves to the outside of the reaction passageway 30. Therefore, the long reaction passageway 30 is ensured in the reaction vessel 1 and the heating area increases on a plurality of the first to fourth reaction tubular walls 12a to 12d, and thus sufficient retention time and heating required to react the supply gas can be ensured and a conversion ratio can be more improved. By continuously forming the reaction passageway 30 while meandering up and down, the size of the entire reaction vessel 1 can be reduced and also heat dissipation of the entire reaction vessel 1 can be reduced.

Since the gas supply internal cylinder 6 is in communication with the upper portion of the first reaction tubular wall 12a and a discharge passageway 7 is connected to the outermost small space 11d of the reaction passageway 30, the reaction product gas in a highest-temperature state obtained by the heating mechanism 2 is transferred from the outermost small space 11d to the discharge passageway 7 in the gas discharge external cylinder 8. Therefore, by rapidly cooling the reaction product gas in a highest-temperature state in the gas discharge external cylinder 8, more rapid cooling operation can be obtained and stable conversion reaction can be obtained.

Heat from the heating mechanism 2 causes thermal expansion of the reaction tubular walls 12a to 12d. The external fourth reaction tubular wall 12d closest to the heating mechanism 2 shows the largest thermal expansion. In this case, since the central portion of the lower supporting circular plate 14 supporting these reaction tubular walls 12a to 12d from below is supported by the support column member 16 and the periphery of the supported section is in a state of floating from the bottom supporting member 23, deflection (deformation) around the support column member 16 occurs easily. Therefore, with respect to the thermal expansion of the reaction tubular walls 12a to 12d, the stress can be absorbed by deflection of the lower supporting circular plate 14.

In the reaction tubular walls 12a to 12d, upper portions of the first reaction tubular wall 12a to the third reaction tubular wall 12c are in contact with the upper supporting circular plate 15. The fourth reaction tubular wall 12d is in contact with the upper annular plate 17. Thermal expansions of the reaction tubular walls 12a to 12d are dispersively received by two places, namely, the upper supporting circular plate 15 and the upper annular plate 17. Deflection of the upper supporting plate 15 occurs easily since the upper supporting plate 15 is, like as the lower supporting plate 14, in a state where the central portion is supported and the outer circumferential portion is in a free state. Since the upper annular plate 17 is fixed to the surface of the heat insulating material 3, thermal expansion of the fourth reaction tubular wall 12d is mainly absorbed by bending of the lower supporting circular plate 14. If a heat insulating material 3 having cushioning properties is used, heat expansion can be absorbed by deflection of the heat insulating material 3 along with bending of the lower supporting circular plate 14.

As described above, heat expansion of the reaction tubular walls 12a to 12d can be efficiently absorbed by bending of the lower and upper supporting circular plates 14 and 15 and also stress is dispersed to the upper supporting circular plate 15 and the upper annular plate 17, and thus cracking can be prevented. Adhesion between these reaction tubular walls 12a to 12d, and the lower and upper supporting circular plates 14 and 15 and the upper annular plate 17 is increased by thermal expansion of the reaction tubular walls 12a to 12d, and thus a self-sealing effect is enhanced. Therefore, leakage of a gas between small spaces 12a to 12d is prevented and reliability of the long reaction passageway 30 is enhanced.

Since the lower supporting circular plate 14 is in a state of floating from the bottom supporting member 23, excellent heat insulating properties can be exhibited along with a heat insulating operation by the space.

Furthermore, since constituent members (first to fourth reaction tubular walls 12a to 12d, lower supporting circular plate 14, upper supporting circular plate 15, upper annular plate 17, gas supply internal cylinder 6 and gas discharge external cylinder 8) of the reaction vessel 1 is formed of carbon coated with silicon carbide (SiC), the production of impurities such as methane, methylchlorosilane, silicon carbide, and the like by the reaction of carbon with hydrogen, chlorosilane and hydrogen chloride (HCl) in the supply gas and the reaction product gas can be prevented, and thus a highly pure trichlorosilane can be obtained.

The technical scope of the present invention is not limited to the above embodiments and various modifications which do not depart from the spirit of the present invention can be added.

For example, while four first to fourth reaction tubular walls 12a to 12d were used in the above embodiments, three or five or more reaction tubular walls may be used. When the number of reaction tubular walls is large, whereas the energy efficiency increases because of the increased heat transfer area, the heating efficiency decreases since it becomes difficult to transfer the radiation heat from the heating mechanism to the inside. Thus, an appropriate number of reaction tubular walls are disposed according to gas flow amount and the size of the entire apparatus.

A cooling mechanism may be added by forming a refrigerant passageway for the flowing of a refrigerant such as water inside the wall of the storage container 5.

Furthermore, the flow through-holes 13 in both reaction tubular walls which form flow passageway between the circumferential faces, may be formed in not only up and down positions but in the circumferential direction so as to be dislocated with each other. In this situation, the passageway between the flow through-holes 13 can be made longer. Also, they do not have to be through-holes and may be flow penetration portions by notches formed in the upper end portion or the lower end portion of the reaction tubular walls. The flow through portion of the present invention may include both through-holes and notches.

The above-described embodiment employed a constitution that the reaction tubular walls 12a to 12d are fit in the ring-shaped grooves 31 of the lower supporting circular plate 14. The ring-shaped grooves may not only be ring-shaped grooves having a rectangular cross section as shown in FIG. 1. As an alternative, the reaction tubular walls may be provided with end surfaces having semicircular cross section, and the ring-shaped grooves may have a semicircular cross section, thereby allowing slight movement and smooth deflection of lower supporting circular plate.

Each of the ring-shaped grooves has the function of disposing each reaction tubular wall in concentric alignment. As an alternative to forming the ring-shaped grooves, for example, the reaction tubular wall may be placed on the top surface of the lower supporting circular plate and a ring-shaped spacer for restricting a relative positional relation may be interposed between the reaction tubular walls.

While the gas supply internal cylinder and the gas discharge external cylinder were disposed above the reaction vessel thereby supplying the supply gas to the upper portion of the reaction vessel and discharging the reaction product gas from the upper portion of the reaction vessel, the gas supply internal cylinder and the gas discharge external cylinder may be disposed below the reaction vessel thereby supplying the supply gas to the lower portion of the reaction vessel and discharging the reaction product gas from the lower portion of the reaction vessel.

EXAMPLES

Using an apparatus for producing trichlorosilane shown in FIG. 1, a conversion ratio was measured under the following test conditions. In Comparative Example, an inlet port and an outlet port of a supply gas in the apparatus for producing trichlorosilane shown in FIG. 1 were exchanged and the supply gas was supplied from a gas discharge pipe 20, and a reaction product gas was discharged from a supply gas introducing pipe 19.

As the test conditions, three test conditions 1 to 3 shown in Table 1, in which each charge flow rate of silicon tetrachloride and hydrogen in the supply gas, and a heating temperature of a heater in a heating mechanism vary, were used.

TABLE 1

|  | Test condition 1 | Test condition 2 | Test condition 3 |
|---|---|---|---|
| Charge flow rate of silicon tetrachloride (L/min) | 6 | 8 | 4 |
| Charge flow rate of hydrogen (L/min) | 2,400 | 2,800 | 2,000 |
| Heating temperature of heater (° C.) | 1,200 | 1,200 | 1,100 |

In these three conditions, a constant charge flow rate of the supply gas was ensured using a mass flow controller and the composition of the reaction product gas was measured using a gas chromatograph. The reaction time was set to 48 hours on the basis of the point of time at which the flow rate and temperature became stable. The conversion ratio was determined as a ratio (mol %) of silicon tetrachloride converted to trichlorosilane per entire charge of silicon tetrachloride during the reaction. The results are shown in Table 2. In the case of the constitution of Example of the present invention, the conversion ratio increased by about 40% compared to Comparative Example.

TABLE 2

| Test conditions | Object | Conversion ratio (mol %) |
|---|---|---|
| Test condition 1 | Example | 26 |
|  | Comparative Example | 19 |
| Test condition 2 | Example | 24 |
|  | Comparative Example | 17 |
| Test condition 3 | Example | 21 |
|  | Comparative Example | 15 |

INDUSTRIAL APPLICABILITY

According to the apparatus for producing trichlorosilane of the present invention, by both effects of cooling through a cooling cylinder and heat exchange of a supply gas, a reaction product gas is rapidly cooled and the reverse reaction of conversion is suppressed, and thus trichlorosilane can be obtained at a high conversion ratio.

The invention claimed is:

1. An apparatus for producing trichlorosilane, comprising:
   a reaction vessel in which a supply gas containing silicon tetrachloride and hydrogen is supplied to produce a reaction product gas containing trichlorosilane and hydrogen chloride;
   a heating mechanism that heats the interior of the reaction vessel;
   a storage container that stores the reaction vessel and the heating mechanism;

a gas supply internal cylinder that supplies the supply gas into the reaction vessel;

a gas discharge external cylinder, with a gas discharge pipe at one end, that is substantially concentrically disposed outside the gas supply internal cylinder, forming a discharge passageway of the reaction product gas between an outer circumferential surface of the gas supply internal cylinder and an inner circumferential surface of the gas discharge external cylinder; and a cooling cylinder, disposed between the gas discharge pipe and the heating mechanism, that supports the gas discharge external cylinder disposed inside thereof and includes a refrigerant passageway formed therein for circulating a refrigerant.

2. The apparatus for producing trichlorosilane according to claim 1, comprising:

an argon supply mechanism that supplies argon in the storage container.

3. The apparatus for producing trichlorosilane according to claim 1, wherein a reaction passageway is formed in the interior of the reaction vessel, in which a plurality of small spaces partitioned by a plurality of reaction tubular walls that have different inner diameters and are substantially concentrically disposed communicate by flow penetration sections formed alternately in lower portions and upper portions of the reaction tubular walls in order from the inside, and the gas supply internal cylinder and the gas discharge external cylinder are connected to the reaction passageway.

4. The apparatus for producing trichlorosilane according to claim 3, wherein the gas supply internal cylinder is in communication with the innermost small space of the plurality of small spaces and the discharge passageway is connected to the outermost small space.

5. The apparatus for producing trichlorosilane according to claim 1, wherein the gas supply internal cylinder and the gas discharge external cylinder are disposed above the reaction vessel, and the central portion of a bottom plate of the reaction vessel is supported by a support column member, which upwardly protrudes in the storage container from below.

6. The apparatus for producing trichlorosilane according to claim 1, wherein a member forming the reaction vessel is formed of carbon.

7. The apparatus for producing trichlorosilane according to claim 6, wherein a surface of the carbon is coated with silicon carbide.

8. The apparatus for producing trichlorosilane according to claim 5, wherein a member forming the reaction vessel is formed of carbon.

9. The apparatus for producing trichlorosilane according to claim 8, wherein a surface of the carbon is coated with silicon carbide.

10. The apparatus for producing trichlorosilane according to claim 2, wherein a reaction passageway is formed in the interior of the reaction vessel, in which a plurality of small spaces partitioned by a plurality of reaction tubular walls which have different inner diameters and are substantially concentrically disposed communicate by flow penetration sections formed alternately in lower portions and upper portions of the reaction tubular walls in order from the inside, and the gas supply internal cylinder and the gas discharge external cylinder are connected to the reaction passageway.

11. The apparatus for producing trichlorosilane according to claim 10, wherein the gas supply internal cylinder is in communication with the innermost small space of the plurality of small spaces and the discharge passageway is connected to the outermost small space.

12. The apparatus for producing trichlorosilane according to claim 10, wherein the gas supply internal cylinder and the gas discharge external cylinder are disposed above the reaction vessel, and the central portion of a bottom plate of the reaction vessel is supported by a support column member, which upwardly protrudes in the storage container, from below.

13. The apparatus for producing trichlorosilane according to claim 10, wherein a member forming the reaction vessel is formed of carbon.

14. The apparatus for producing trichlorosilane according to claim 13, wherein a surface of the carbon is coated with silicon carbide.

15. The apparatus for producing trichlorosilane according to claim 3, wherein the gas supply internal cylinder and the gas discharge external cylinder are disposed above the reaction vessel, and the central portion of a bottom plate of the reaction vessel is supported by a support column member, which upwardly protrudes in the storage container from below.

16. The apparatus for producing trichlorosilane according to claim 3, wherein a member forming the reaction vessel is formed of carbon.

17. The apparatus for producing trichlorosilane according to claim 11, wherein the gas supply internal cylinder and the gas discharge external cylinder are disposed above the reaction vessel, and the central portion of a bottom plate of the reaction vessel is supported by a support column member, which upwardly protrudes in the storage container, from below.

18. The apparatus for producing trichlorosilane according to claim 1, wherein the gas discharge external cylinder protrudes into the storage container and is fixed to the reaction vessel.

19. An apparatus for producing trichlorosilane, comprising:

a reaction vessel in which a supply gas containing silicon tetrachloride and hydrogen is supplied to produce a reaction product gas containing trichlorosilane and hydrogen chloride;

a heating mechanism that heats the interior of the reaction vessel;

a storage container that stores the reaction vessel and the heating mechanism;

a gas supply internal cylinder that supplies the supply gas into the reaction vessel;

a gas discharge external cylinder that is substantially concentrically disposed outside the gas supply internal cylinder, forming a discharge passageway of the reaction product gas between an outer circumferential surface of the gas supply internal cylinder and an inner circumferential surface of the gas discharge external cylinder; and a cooling cylinder that supports the gas discharge external cylinder disposed inside thereof and includes a refrigerant passageway formed therein for circulating a refrigerant, wherein a reaction passageway is formed in the interior of the reaction vessel, in which a plurality of small spaces partitioned by a plurality of reaction tubular walls that have different inner diameters and are substantially concentrically disposed communicate by flow penetration sections formed alternately in lower portions and upper portions of the reaction tubular walls in order from the inside, and the gas supply internal cylinder and the gas discharge external cylinder are connected to the reaction passageway.

20. An apparatus for producing trichlorosilane, comprising:
- a reaction vessel in which a supply gas containing silicon tetrachloride and hydrogen is supplied to produce a reaction product gas containing trichlorosilane and hydrogen chloride;
- a heating mechanism that heats the interior of the reaction vessel;
- a storage container that stores the reaction vessel and the heating mechanism;
- a gas supply internal cylinder that supplies the supply gas into the reaction vessel;
- a gas discharge external cylinder that is substantially concentrically disposed outside the gas supply internal cylinder, forming a discharge passageway of the reaction product gas between an outer circumferential surface of the gas supply internal cylinder and an inner circumferential surface of the gas discharge external cylinder; and
- a cooling cylinder that supports the gas discharge external cylinder disposed inside thereof and includes a refrigerant passageway formed therein for circulating a refrigerant, wherein the gas supply internal cylinder and the gas discharge external cylinder are disposed above the reaction vessel, and the central portion of a bottom plate of the reaction vessel is supported by a support column member, which upwardly protrudes in the storage container from below.

* * * * *